United States Patent
Deng et al.

(10) Patent No.: US 12,266,342 B2
(45) Date of Patent: Apr. 1, 2025

(54) MULTI-SPEAKER NEURAL TEXT-TO-SPEECH SYNTHESIS

(71) Applicant: Microsoft Technology Licensing, LLC, Redmond, WA (US)

(72) Inventors: Yan Deng, Redmond, WA (US); Lei He, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 287 days.

(21) Appl. No.: 17/293,640

(22) PCT Filed: Dec. 11, 2018

(86) PCT No.: PCT/CN2018/120300
§ 371 (c)(1),
(2) Date: May 13, 2021

(87) PCT Pub. No.: WO2020/118521
PCT Pub. Date: Jun. 18, 2020

(65) Prior Publication Data
US 2022/0013106 A1    Jan. 13, 2022

(51) Int. Cl.
*G10L 13/08*    (2013.01)
*G06N 3/045*    (2023.01)
*G10L 13/047*   (2013.01)

(52) U.S. Cl.
CPC .............. *G10L 13/08* (2013.01); *G06N 3/045* (2023.01); *G10L 13/047* (2013.01)

(58) Field of Classification Search
None
See application file for complete search history.

(56) References Cited

U.S. PATENT DOCUMENTS 9,384,728 B2    7/2016  De Freitas et al.
10,872,601 B1*  12/2020 Acharya ............... G06F 40/295
(Continued)

FOREIGN PATENT DOCUMENTS

CN    1835074 A    9/2006
CN    102203853 A  9/2011
(Continued)

OTHER PUBLICATIONS

Sercan Arik, Gregory Diamos, Andrew Gibiansky, John Miller, Kainan Peng, Wei Ping, Jonathan Raiman, Yang Zhou; Deep Voice 2: Multi-Speaker Neural Text-to-Speech; Sep. 2017; URL:https://arxiv.org/abs/1705.08947 (Year: 2017).*

(Continued)

*Primary Examiner* — Richa Sonifrank
(74) *Attorney, Agent, or Firm* — Schwegman Lundberg & Woessner, P.A.

(57) ABSTRACT

A method for generating speech through multi-speaker neural text-to-speech (TTS) synthesis is provided. A text input may be received (1410). Speaker latent space information of a target speaker may be provided through at least one speaker model (1420). At least one acoustic feature may be predicted through an acoustic feature predictor based on the text input and the speaker latent space information (1430). A speech waveform corresponding to the text input may be generated through a neural vocoder based on the at least one acoustic feature and the speaker latent space information (1440).

19 Claims, 7 Drawing Sheets

(56) References Cited

U.S. PATENT DOCUMENTS

| | | | |
|---|---|---|---|
| 2015/0039301 A1* | 2/2015 | Senior | G06N 3/02 |
| | | | 704/232 |
| 2017/0287478 A1* | 10/2017 | Schulz | G10L 15/22 |
| 2018/0211649 A1 | 7/2018 | Li | |
| 2018/0336880 A1* | 11/2018 | Arik | G10L 25/30 |
| 2019/0066713 A1* | 2/2019 | Mesgarani | G10L 25/30 |
| 2019/0122651 A1* | 4/2019 | Arik | G10L 13/08 |
| 2019/0251952 A1* | 8/2019 | Arik | G10L 13/08 |
| 2019/0279618 A1* | 9/2019 | Yadav | G06F 40/30 |
| 2019/0348020 A1* | 11/2019 | Clark | G06N 3/047 |
| 2020/0402497 A1* | 12/2020 | Semenov | G06N 3/045 |
| 2022/0246136 A1* | 8/2022 | Yang | G06N 3/08 |
| 2023/0081659 A1* | 3/2023 | Pan | G10L 13/033 |
| | | | 704/259 |
| 2023/0281448 A1* | 9/2023 | Ma | G06N 3/084 |
| | | | 706/21 |

FOREIGN PATENT DOCUMENTS

| | | | | |
|---|---|---|---|---|
| CN | 103021418 A | | 4/2013 | |
| CN | 106688034 A | | 5/2017 | |
| CN | 107103900 A | | 8/2017 | |
| CN | 108573693 A | | 9/2018 | |
| CN | 108986793 A | * | 12/2018 | G06F 40/58 |
| EP | 3151239 A1 | | 4/2017 | |
| KR | 101665882 B1 | | 10/2016 | |

OTHER PUBLICATIONS

Danwei Cai, Zexin Cai and Ming Li; Deep Speaker Embeddings with Convolutional Neural Network on Supervector for Text-Independent Speaker Recognition; Nov. 2018; URL: https://ieeexplore.ieee.org/stamp/stamp.jsp?tp=&arnumber=8659595 (Year: 2018).*

Sercan Arik, Gregory Diamos, Andrew Gibiansky, John Miller, Kainan Peng, Wei Ping, Jonathan Raiman, Yanqi Zhou; Deep Voice 2: Multi-Speaker Neural Text-to-Speech; Sep. 20, 2017: URL: https://arxiv.org/pdf/1705.08947 (Year: 2017).*

Arik, et al., "Deep Voice 2: Multi-Speaker Neural Text-to-Speech", In Proceedings of Advances in Neural Information Processing Systems 30: Annual Conference on Neural Information Processing Systems, Dec. 4, 2017, 9 Pages.

Arik, et al., "Deep Voice: Real-time Neural Text-to-Speech", In Proceedings of the 34th International Conference on Machine Learning, Aug. 6, 2017, 10 Pages.

Arik, et al., "Neural Voice Cloning with a Few Samples", In Repository of arXiv:1802.06006, Feb. 14, 2018, 16 Pages.

Deng, et al., "Modeling Multi-speaker Latent Space to Improve Neural TTS: Quick Enrolling New Speaker and Enhancing Premium Voice", In Journal of Computing Research Repository, Dec. 13, 2018, 5 Pages.

Fan, et al., "Multi-Speaker Modeling and Speaker Adaptation for DNN-based TTS Synthesis", In Proceedings of IEEE International Conference on Acoustics, Speech and Signal Processing, Apr. 19, 2015, pp. 4475-4479.

Jia, et al., "Transfer Learning from Speaker Verification to Multispeaker Text-To-Speech Synthesis", In Proceedings of 32nd Conference on Neural Information Processing Systems, Dec. 3, 2018, 11 Pages.

Li, et al., "Deep Speaker: an End-to-End Neural Speaker Embedding System", In Repository of arXiv:1705.02304, May 5, 2017, 8 Pages.

Li, et al., "Multi-Language Multi-Speaker Acoustic Modeling for LSTM-RNN Based Statistical Parametric Speech Synthesis", In Journal of Interspeech 2016, Sep. 8, 2016, 5 Pages.

Nachmani, et al., "Fitting New Speakers Based on a Short Untranscribed Sample", In Repository of arXiv:1802.06984, Feb. 20, 2018, 9 Pages.

Oord, et al., "WaveNet: A Generative Model for Raw Audio", In Repository of arXiv:1609.03499, Sep. 19, 2016, 15 Pages.

"International Search Report and Written Opinion Issued in PCT Application No. PCT/CN18/120300", Mailed Date: Sep. 27, 2019, 11 Pages.

Ping, et al., "Deep Voice 3: 2000-Speaker Neural Text-to-Speech", In Repository of arXiv:1710.07654v1, Oct. 20, 2017, 15 Pages.

Shen, et al., "Natural TTS Synthesis by Conditioning Wavenet on MEL Spectrogram Predictions", In Proceedings of International Conference on Acoustics, Speech and Signal Processing, Apr. 15, 2018, pp. 4779-4783.

Sotelo, et al., "Char2Wav: End-to-End Speech Synthesis", In Proceedings of 5th International Conference on Learning Representations, Apr. 24, 2017, 6 Pages.

Taigman, et al., "VoiceLoop: Voice Fitting and Synthesis via a Phonological Loop", In Proceedings of 6th International Conference on Learning Representations, Feb. 1, 2018, 14 Pages.

Wang, et al., "Style Tokens: Unsupervised Style Modeling, Control and Transfer in End-to-End Speech Synthesis", In Proceedings of the 35th International Conference on Machine Learning, Jul. 10, 2018, 10 Pages.

Wang, et al., "Tacotron: Towards End-to-End Speech Synthesis", In Proceedings of 18th Annual Conference of the International Speech Communication Association, Aug. 20, 2017, pp. 4006-4010.

Yamagishi, et al., "Average-Voice-Based Speech Synthesis Using HSMM-Based Speaker Adaptation and Adaptive Training", In Journal of IEICE Transactions on Information and Systems, vol. 90, Issue 2, Feb. 1, 2007, pp. 533-543.

"Extended European Search Report Issued in European Application No. 18942805.5", Mailed Date: May 30, 2022, 8 Pages.

Communication 71(3) Received for European Application No. 18942805.5, mailed on Apr. 18, 2024, 9 pages.

Decision to grant a European patent pursuant to Article 97(1) received in European Application No. 18942805.5, mailed on Aug. 16, 2024, 2 pages.

"First Office Action and Search Report Issued in Chinese Patent Application No. 201880091361.8", Mailed Date: Aug. 18, 2023, 15 Pages.

* cited by examiner

MULTI-SPEAKER NEURAL TEXT-TO-SPEECH SYNTHESIS

CROSS-REFERENCE TO RELATED APPLICATION

This application is a U.S. National Stage Filing under 35 U.S.C. 371 of International Patent Application Serial No. PCT/CN2018/120300, filed Dec. 11, 2018, and published as WO 2020/118521 A1 on Jun. 18, 2020, which application and publication are incorporated herein by reference in their entirety.

BACKGROUND

Text-to-speech (TTS) synthesis aims at generating a corresponding speech waveform based on a text input. The TTS synthesis is widely applied for, e.g., role playing in a fairytale, speech-to-speech translation, speech customization for certain users, etc. Neural TTS system is being more and more adopted for implementing TTS synthesis, and is tending to be one of the most popular directions in Artificial intelligence (AI) field in recent years. The neural TTS system may predict acoustic features based on a text input, and further generate a speech waveform based on the predicted acoustic features. Different from traditional TTS techniques which require well-designed frontend linguistic features, the neural TN system is modeled in an end-to-end structure and may be trained directly based on text-speech data pairs. The neural TTS system may jointly optimize pronunciation, prosody, etc. of speech, which results in more natural synthesized speech than the traditional TI'S techniques.

SUMMARY

This Summary is provided to introduce a selection of concepts that are further described below in the Detailed Description. It is not intended to identify key features or essential features of the claimed subject matter, nor is it intended to be used to limit the scope of the claimed subject matter.

Embodiments of the present disclosure propose method and apparatus for generating speech through multi-speaker neural TTS synthesis. A text input may be received. Speaker latent space information of a target speaker may be provided through at least one speaker model. At least one acoustic feature may be predicted through an acoustic feature predictor based on the text input and the speaker latent space information. A speech waveform corresponding to the text input may be generated through a neural vocoder based on the at least one acoustic feature and the speaker latent space information.

It should be noted that the above one or more aspects comprise the features hereinafter fully described and particularly pointed out in the claims. The following description and the drawings set forth in detail certain illustrative features of the one or more aspects. These features are only indicative of the various ways in which the principles of various aspects may be employed, and this disclosure is intended to include all such aspects and their equivalents.

BRIEF DESCRIPTION OF THE DRAWINGS

The disclosed aspects will hereinafter be described in connection with the appended drawings that are provided to illustrate and not to limit the disclosed aspects.

DETAILED DESCRIPTION

The present disclosure will now be discussed with reference to several example implementations. It is to be understood that these implementations are discussed only for enabling those skilled in the art to better understand and thus implement the embodiments of the present disclosure, rather than suggesting any limitations on the scope of the present disclosure.

Although a neural TTS system may generate natural speech with high fidelity, it needs a large amount of text-speech training data pairs due to its end-to-end model nature. Usually, a training corpus of around 10+ hours of speech may be still not enough for training a good end-to-end neural TI'S system. Herein, "corpus" may refer to a set of speeches with each speech being attached with a corresponding text, and thus a corpus may provide a plurality of text-speech data pairs. A challenge for the neural TTS system is its generalization ability. Degradation of naturalness on synthesizing an out-of-domain text often happens, especially for a long text with a rather complex context. Herein, "out-of-domain" text refers to a text input which is not involved in a training corpus, or for which no relevant text input is involved in the training corpus. The limits from generation model architecture in the neural TTS system may result in various out-of-domain errors, e.g., wrong pronunciation, strange prosody, repeating or skipping word/phoneme, etc. Although adding more training data is a brute force solution, such heavy data requirements cannot be satisfied by, using a single speaker corpus which always provides limited text-speech data pairs. Moreover, it would also raise a very high cost bar to build a neural TTS system for speech customization which requires enough speech data for a target speaker.

In order to relief the dependency on data size by the neural TTS system, training data may be augmented by combining corpuses of multiple speakers into a multi-speaker corpus set. The multi-speaker corpus set may be used for training a multi-speaker neural TTS system. The multi-speaker neural TI'S system may generate better speech than a single-speaker TTS system, and can be used for creating customized speech using a limited-size corpus. However, due to the limits of traditional model architecture of such multi-speaker neural TTS system, rich content and speaker information in the multi-speaker corpus set are not well modeled, and the generated speech still has unnatural and muffled problems. Moreover, speaker similarity is also low for a target speaker having only a small corpus. The overall performance of such system is still far from actual application requirements.

Embodiments of the present disclosure propose new approaches to building a multi-speaker neural TI'S system with a well-designed multi-speaker corpus set. In some aspects, a high-quality multi-speaker corpus set may be prepared in consideration of content coverage, speaker variety, style variety, etc. For example, the corpus set may have wide content coverage in various knowledge domains, thus the multi-speaker neural ITS system may leverage content from different speakers in various domains and perform better in terms of generalization. For example, speakers in the corpus set may have a balanced distribution in terms of age, gender, accents, etc., which makes it much easier to create speech for a target speaker having only a small corpus. This may facilitate to create high-fidelity customized speech through the multi-speaker neural TTS system. The corpus set as discussed above will be helpful for the multi-speaker neural TTS system to generate close-to-human speech for out-of-domain text inputs, especially for long sentences with complex context, thus enriching premium voices.

In some aspects, the embodiments of the present disclosure propose new model architecture for the multi-speaker neural TTS system in order to make better use of the multi-speaker corpus set and improve speech generalization ability. The multi-speaker neural TTS system may be built with full utilization of latent space information of speakers in the corpus set. The multi-speaker neural TTS system may be further updated, e.g., retrained by a subset of training data pairs in the corpus set, adapted to a target speaker with a corpus of the target speaker, etc. For example, after the multi-speaker neural TTS system was trained by the corpus set, the multi-speaker neural TTS system may be further retrained or refined by a corpus of at least one speaker in the corpus set. For example, when it is to generate speech for a target speaker, e.g., stimulating voices of the target speaker to speak, the multi-speaker neural TTS system may be adapted to the target speaker through being updated or retrained by a corpus of the target speaker. Accordingly, the multi-speaker neural TTS system may generate high quality speech with high speaker similarity.

Figure 1:
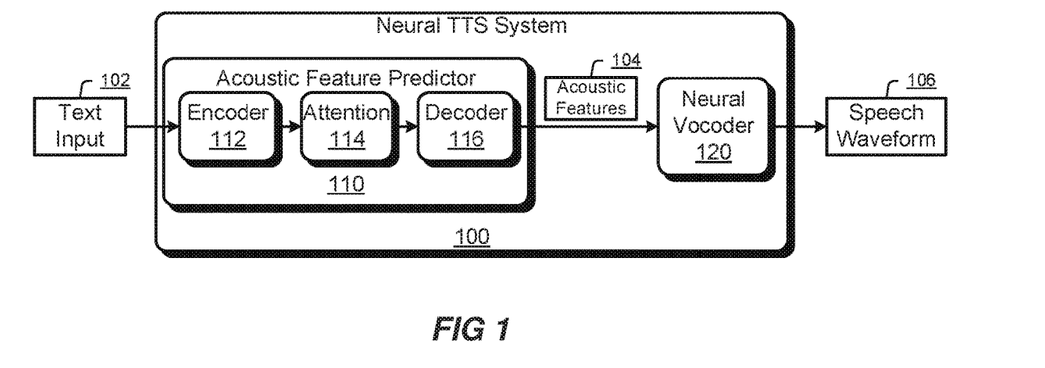
FIG. 1 illustrates an exemplary traditional neural TTS system.

FIG. 1 illustrates an exemplary traditional neural TTS system 100. The neural TTS system 100 may be configured for receiving a text input 102 and generating a speech waveform 106 corresponding to the text input 102. The text input 102 may be a word, phrase, sentence, etc. It should be appreciated that although it is shown in FIG. 1 that the text input 102 is provided to the neural TT'S system 100, the text input 102 may also be firstly split into a sequence of elements, e.g., a phoneme sequence, a grapheme sequence, a character sequence, etc. through various existing techniques, e.g., Letter-to-Sound (LTS), etc., and then the sequence may be provided to the neural TTS system 100 as input. Thereinafter, a "text input" may also be broadly interpreted as a sequence of elements obtained from the text input, such as a phoneme sequence, a grapheme sequence, a character sequence, etc.

The neural TTS system 100 may comprise an acoustic feature predictor 110. The acoustic feature predictor 110 may predict acoustic features 104 from the text input 102. The acoustic features 104 may comprise various traditional TTS acoustic features, e.g., mel-spectrum, linear spectrum pairs (LSP), etc. The acoustic feature predictor 110 may be based on various model architectures, e.g., a sequence-to-sequence model architecture, etc. FIG. 1 shows an exemplary sequence-to-sequence acoustic feature predictor 110, which may comprise an encoder 112, an attention unit 114 and a decoder 116.

The encoder 112 may convert information contained in the text input 102 into a space that is more robust and more suitable to learn alignment with acoustic features, e.g., converting the information in the text input 102 into text features in the space. The encoder 112 may be based on various network structures, a network structure comprising a combination of a plurality of convolutional neural network (CNN) layers and a plurality of recurrent neural network (RNN) layers, a network structure comprising a combination of 1-D convolutional filters, highway networks and bi-directional RNN, and so on.

The attention unit 114 may implement an attention mechanism which acts as a bridge connecting the encoder 112 and the decoder 116. For example, the attention mechanism may facilitate to make alignment between text features output by the encoder 112 and acoustic features. Various types of attention mechanism may be implemented by the attention unit 114, e.g., soft attention, hard attention, location sensitive attention, Gaussian Mixture Model (GMM) attention, etc.

The decoder 116 may map the text features output by the encoder 112 to the acoustic features 104 under impacts by the attention mechanism in the attention unit 114. The decoder 116 may be based on various network structures, e.g., a network structure comprising a combination of feed-forward layers, Long Short Term Memory (LSTM) layers and CNN layers, and so on.

The neural TTS system 100 may comprise a neural vocoder 120. The neural vocoder 120 may generate the speech waveform 106 based on the predicted acoustic features 104 output by the acoustic feature predictor 110. The neural vocoder 120 may be based on various network structures, e.g., a network structure which is based on neural generative models, and so on.

Figure 2:
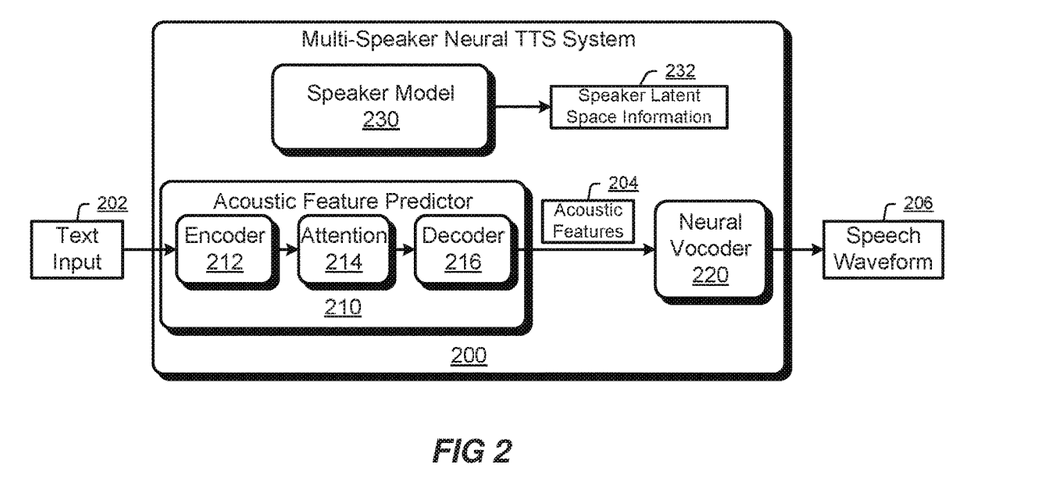
FIG. 2 illustrates an exemplary architecture of a multi-speaker neural TTS system according to an embodiment.

FIG. 2 illustrates an exemplary architecture of a multi-speaker neural TTS system 200 according to an embodiment. It should be appreciated that the architecture shown in FIG. 2 is only a diagram for the sake of explaining some concepts or aspects of the present disclosure, and the multi-speaker neural TTS system 200 may actually have various implementation approaches. The multi-speaker neural TTS system 200 may generate speech for a variety of speakers involved in a multi-speaker corpus set used for training the multi-speaker neural TTS system 200, and may also generate speech for a new speaker. During generating speech, the multi-speaker neural TTS system 200 may consider discriminative information in a speaker latent space, e.g., speaker latent space information. During generating speech for a target speaker, the speaker latent space information may be used for controlling to generate speech with characteristics of the target speaker.

As shown in FIG. 2, the multi-speaker neural TTS system 200 may be configured for receiving a text input 202, and generating a speech waveform 206 corresponding to the text input 102 in a target speaker's voices. The multi-speaker neural TTS system 200 may comprise an acoustic feature predictor 210, a neural vocoder 220 and a speaker model 230.

The speaker model 230 may provide speaker latent space information 232 of a target speaker. The speaker latent space information 232 may be representations of speaker characteristics in the speaker latent space, a speaker embedding vector of the target speaker. The speaker latent space information 232 may be used as additional information, a condition, for the acoustic feature predictor 210 and the neural vocoder 220. Accordingly, the speaker latent space information 232 may be considered during the processing by the acoustic feature predictor 210 and the neural vocoder 220. It should be appreciated that although it is recited in some parts of the present disclosure that a speaker embedding vector is provided by a speaker model, the speaker embedding vector is merely an exemplary instance of speaker latent space information provided by the speaker model, and those operations or processes discussed in connection with the speaker embedding vector may also be applied for any other instances of the speaker latent space information in a similar way.

Basic functions and structures of the acoustic feature predictor 210 may be similar with those of the acoustic feature predictor 110 in FIG. 1, except that it further takes the speaker latent space information 232 into consideration. In other words, the acoustic feature predictor 210 may predict acoustic features 204 based on the text input 202 and the speaker latent space information 232. The acoustic feature predictor 210 may comprise an encoder 212, an attention unit 214 and a decoder 216. The speaker latent space information 232 may be combined with an output from the encoder 212, and then passed to the attention unit 214. The attention mechanism in the attention unit 214 may utilize the combination of the latent space information 232 and the output from the encoder 212 for impacting the processing by the decoder 216, Accordingly, acoustic features output by the decoder 216 may be associated with the target speaker.

Basic functions and structures of the neural vocoder 220 is similar with those of the neural vocoder 120 in FIG. 1, except that it further takes the speaker latent space information 232 into consideration. Although the predicted acoustic features 204 may have reflected speaker characteristics, it would be still helpful if the processing by the neural vocoder 220 may further consider speaker characteristics, since the neural vocoder 220 is trained by the multi-speaker corpus set and is actually a speaker adaptive neural vocoder. The neural vocoder 220 may generate the speech waveform 206 based on the acoustic features 204 and the speaker latent space information 232. In an implementation, the neural vocoder 220 may generate the speech waveform 206 sample by sample, wherein a collection of the samples forms the speech waveform 206.

Through utilizing the speaker latent space information 232 as a condition for the acoustic feature predictor 210 and the neural vocoder 220, the multi-speaker neural TTS system 200 may generate highly natural output speech which sounds very similar to the target speaker.

Figure 3:
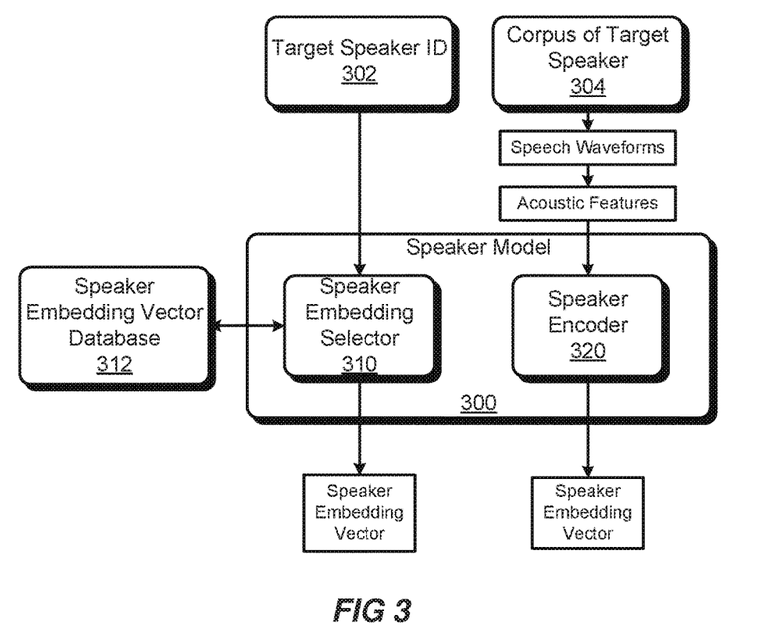
FIG. 3 illustrates exemplary implementations of a speaker model according to an embodiment.

FIG. 3 illustrates exemplary implementations of a speaker model 300 according to an embodiment. The speaker model 300 may correspond to the speaker model 230 in FIG. 2. The speaker model 300 may be implemented in various approaches.

In an implementation, the speaker model 300 may be implemented through a speaker embedding selector 310. The speaker embedding selector 310 may obtain identity information 302 of a target speaker which may be any types of information capable of identifying the target speaker from other speakers, e.g., a random or assigned number for the target speaker, the name of the target speaker, description information of the target speaker, etc., and the identity information is briefly denoted as "target speaker ID" hereinafter. The speaker embedding selector 310 may try to retrieve a speaker embedding vector corresponding to the target speaker ID 302 from a speaker embedding vector database 312. The speaker embedding vector database 312 may comprise a plurality of speaker embedding vectors corresponding to a plurality of speakers respectively. The speaker embedding vector database 312 may be established through collecting speaker embedding vectors of those speakers in a multi-speaker corpus set during training the multi-speaker neural TTS system, or collecting speaker embedding vectors of previous target speakers during applying the multi-speaker neural TTS system.

In an implementation, the speaker model 300 may be implemented through a speaker encoder 320. The speaker encoder 320 may generate a speaker embedding vector corresponding to the target speaker based on a corpus 304 of the target speaker. For example, the corpus 304 of the target speaker may be obtained, which includes a plurality of speech waveforms of the target speaker. Acoustic features may be extracted from the speech waveforms in the corpus 304 through various traditional techniques, and provided to the speaker encoder 320. The speaker encoder 320 may generate the speaker embedding vector corresponding to the target speaker based on the acoustic features of the target speaker. The speaker encoder 320 may be implemented by various techniques. For example, the speaker encoder may be a neural network for generating an embedding vector based on acoustic features.

Figure 4:
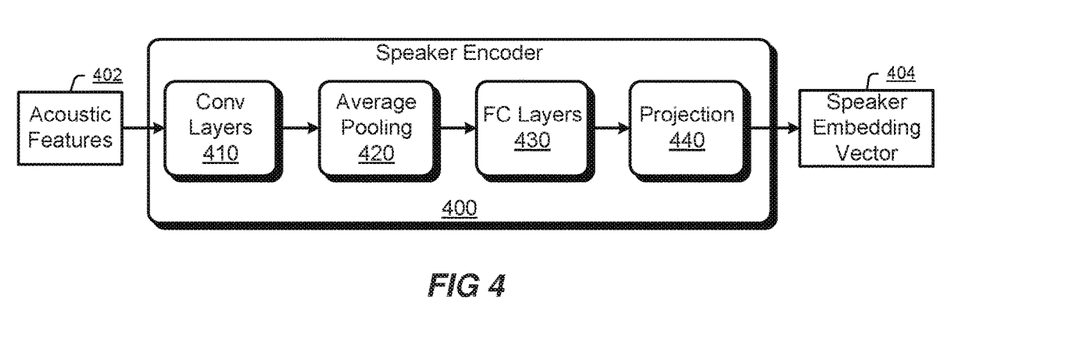
FIG. 4 illustrates an exemplary implementation of a speaker encoder according to an embodiment.

FIG. 4 illustrates an exemplary implementation of a speaker encoder 400 according to an embodiment. The speaker encoder 400 may correspond to the speaker encoder 320 in FIG. 3. As shown in FIG. 4, the speaker encoder 400 may be based on a neural network which is used for generating a speaker embedding vector 404 based on acoustic features 402. The speaker encoder 400 may sequentially comprise a plurality of convolutional layers 410, average pooling 420, a plurality of fully connected (FC) layers 430 and an affine projection 440. The speaker embedding vector 404 may be formed by L2-normalization of projection output. The speaker encoder 400 may be trained by a corpus set of multiple speakers, and is designed for text-independent speaker recognition. Thus, the speaker encoder 400 may, independently from contents, provide better estimation of speaker embedding vectors.

Figure 5:
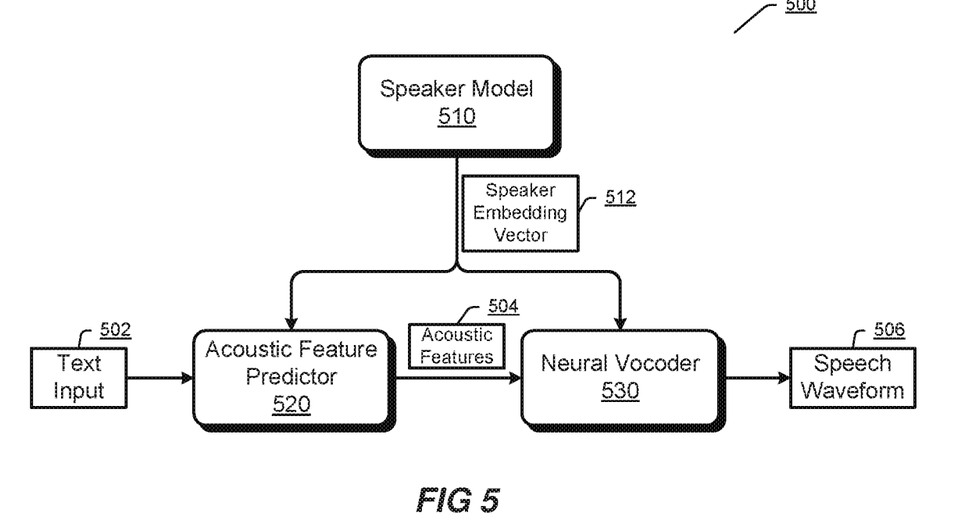
FIG. 5 illustrates an exemplary implementation of a multi-speaker neural TTS system according to an embodiment.

FIG. 5 illustrates an exemplary implementation 500 of a multi-speaker neural TTS system according to an embodiment. The implementation 500 shows an exemplary structure of the multi-speaker neural TTS system 200 in FIG. 2, wherein the speaker model 230 in FIG. 2 is implemented as a single speaker model 510. The speaker model 510 may provide a speaker embedding vector 512 of a target speaker.

The speaker embedding vector 512 may be provided to an acoustic feature predictor 520 and a neural vocoder 530 respectively. The acoustic feature predictor 520 may receive a text input 502 and predict acoustic features 504 based on the text input 502 and the speaker embedding vector 512. The neural vocoder 530 may generate a speech waveform 506 corresponding to the text input 502 based on the acoustic features 504 and the speaker embedding vector 512.

Figure 6:
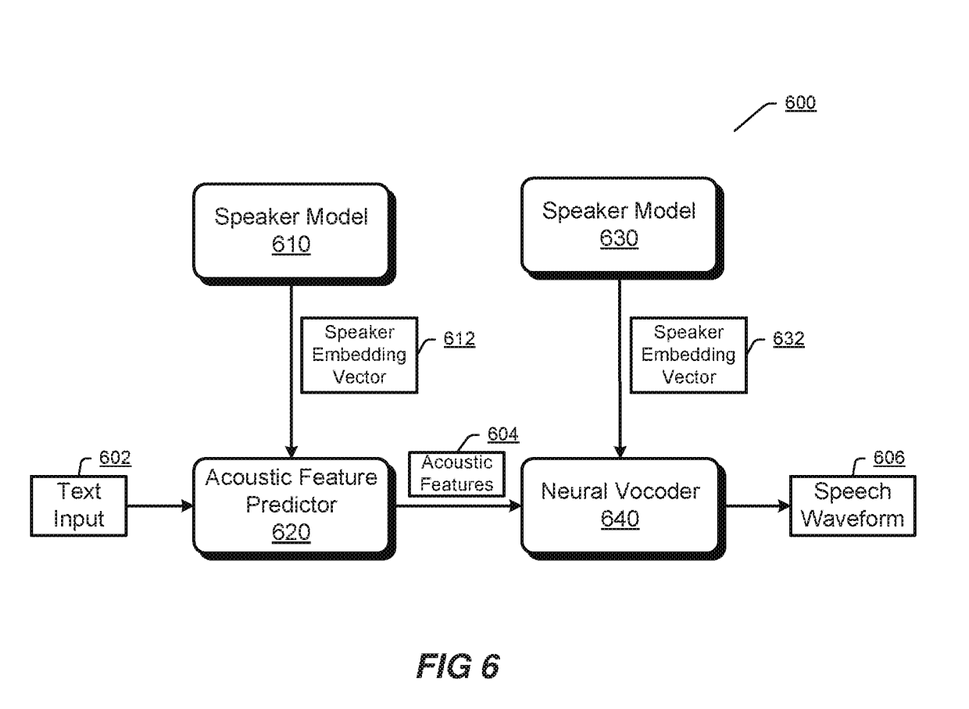
FIG. 6 illustrates an exemplary implementation of a multi-speaker neural TTS system according to an embodiment.

FIG. 6 illustrates an exemplary implementation 600 of a multi-speaker neural TTS system according to an embodiment. The implementation 600 shows an exemplary structure of the multi-speaker neural TTS system 200 in FIG. 2, wherein the speaker model 230 in FIG. 2 is implemented as two different speaker models 610 and 630. The speaker model 610 and the speaker model 630 are established for providing respective speaker embedding vectors of the target speaker to an acoustic feature predictor 620 and a neural vocoder 640 respectively.

The speaker model 610 may provide a speaker embedding vector 612 of the target speaker to the acoustic feature predictor 620. The acoustic feature predictor 620 may receive a text input 602 and predict acoustic features 604 based on the text input 602 and the speaker embedding vector 612.

The speaker model 630 may provide a speaker embedding vector 632 of the target speaker to the neural vocoder 640. The neural vocoder 640 may generate a speech waveform 606 corresponding to the text input 602 based on the acoustic features 604 and the speaker embedding vector 632.

Figure 7:
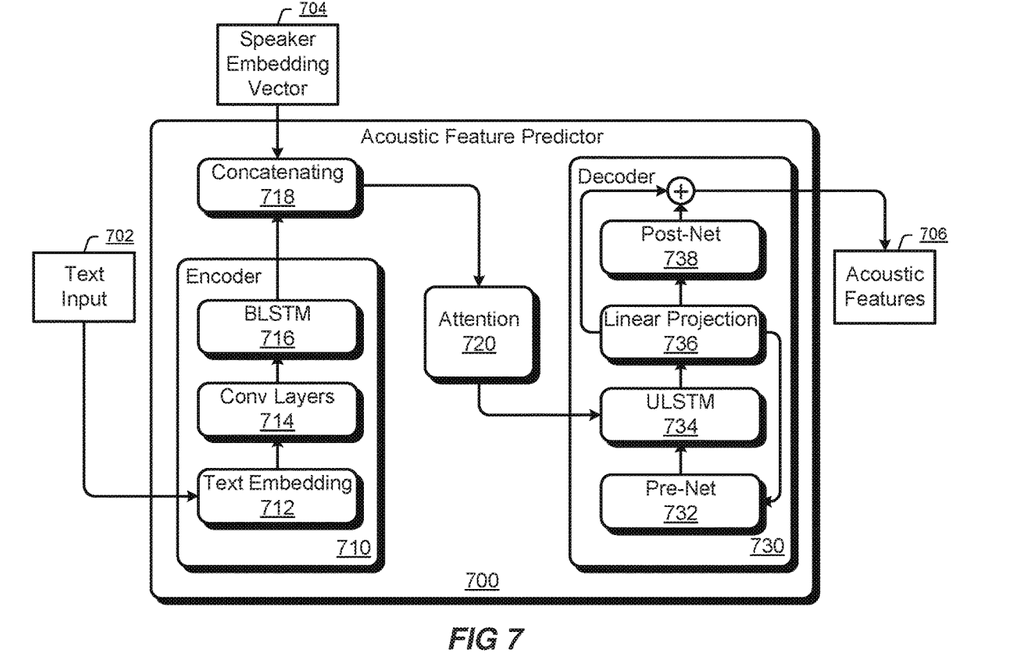
FIG. 7 illustrates an exemplary implementation of an acoustic feature predictor according to an embodiment.

FIG. 7 illustrates an exemplary implementation of an acoustic feature predictor 700 according to an embodiment. The acoustic feature predictor 700 may correspond to the acoustic feature predictor 210 in FIG. 2, the acoustic feature predictor 520 in FIG. 5, or the acoustic feature predictor 620 in FIG. 6. The acoustic feature predictor 700 may comprise an encoder 710, an attention unit 720 and a decoder 730.

A text input 702 may be provided to the encoder 710 which may correspond to the encoder 212 in FIG. 2. A text embedding unit 712 in the encoder 710 may convert the text input 702 into a text embedding vector, and the text embedding vector may be further processed through a plurality of convolutional layers 714 and a bi-directional LSTM (BLSTM) 716 in the encoder 710, The encoder 710 may output text features corresponding to the text input 702, which are further combined with a speaker embedding vector 704. For example, a concatenating unit 718 may be used for providing a combination of the speaker embedding vector 704 and the text features, wherein the speaker embedding vector 704 may correspond to the speaker latent space information 232 in FIG. 2, the speaker embedding vector 512 in FIG. 5, or the speaker embedding vector 612 in FIG. 6.

The combination of the speaker embedding vector 704 and the text features may be provided to the attention unit 720 which may correspond to the attention unit 214 in FIG. 2. An attention mechanism implemented in the attention unit 720 may utilize the combination of the speaker embedding vector 702 and the text features to impact the processing by the decoder 730, wherein the decoder 730 may correspond to the decoder 216 in FIG. 2.

The decoder 730 may comprise a pre-net 732 consisted of feed-forward layers, a uni-directional LSTM (ULSTM) 734, a linear projection 736 and a post-net 738 consisted of convolutional layers. The ULSTM 734 may receive an input from the pre-net 732 and provide its output to the linear projection 736, and meanwhile the processing by the ULSTM 734 is impacted by the attention unit 720. The linear projection 736 may provide its output to the pre-net 732 and the post-net 738 respectively. Finally, an output from the post-net 738 and the output from the linear projection 736 may be combined so as to produce acoustic features 706. The acoustic features 706 may correspond to the acoustic features 204 in FIG. 2, the acoustic features 504 in FIG. 5, or the acoustic features 604 in FIG. 6. In an implementation, the linear projection 736 may also be used for generating stop tokens.

It should be appreciated that the structure of the acoustic feature predictor 700 in FIG. 7 is exemplary, and depending on specific application designs and requirements, the acoustic feature predictor 700 may be implemented in any other approaches.

Figure 8:
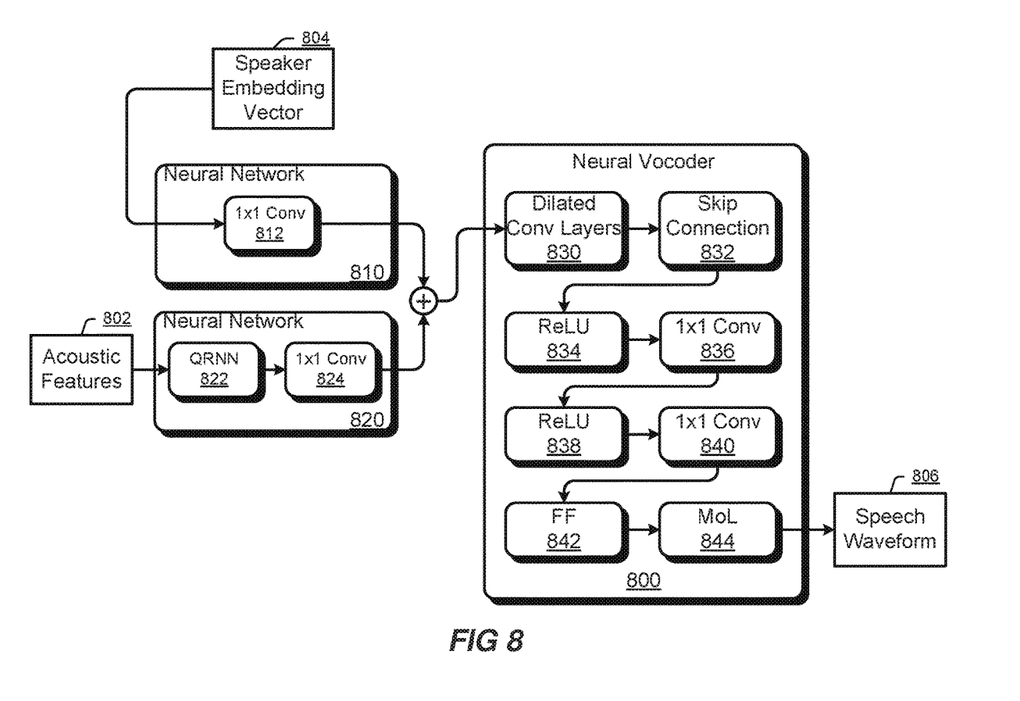
FIG. 8 illustrates an exemplary implementation of a neural vocoder according to an embodiment.

FIG. 8 illustrates an exemplary implementation of a neural vocoder 800 according to an embodiment. The neural vocoder 800 may correspond to the neural vocoder 220 in FIG. 2, the neural vocoder 530 in FIG. 5, and the neural vocoder 640 in FIG. 6.

As discussed above, speaker characteristics may be further considered by the neural vocoder, such that the neural vocoder may get more information of the target speaker in a speaker latent space. Since a speaker embedding vector which reflects speaker characteristics may have different dimensions and different value ranges from acoustic features, the speaker embedding vector and the acoustic features may be firstly transformed into the same dimension with a similar dynamic range of value through, e.g., neural networks.

As shown in FIG. 8, a speaker embedding vector 804 may be input to a neural network 810. The speaker embedding vector 804 may correspond to the speaker latent space information 232 in FIG. 2, the speaker embedding vector 512 in FIG. 5, or the speaker embedding vector 612 in FIG. 6. The neural network 810 may be based on various structures, e.g., a 1/1 convolutional layer 812. Through the neural network 810, a transformed speaker embedding vector may be obtained.

Moreover, acoustic features 802, which may correspond to the acoustic features 706 in FIG. 7, may be input to a neural network 820. The neural network 820 may be based on various structures, e.g., a Quasi-Recurrent Neural Network (QRNN) 822 followed by a 1/1 convolutional layer 824. Through the neural network 820, transformed acoustic features may be obtained, which may have the same dimension and similar dynamic range of value as compared with the transformed speaker embedding vector.

The transformed acoustic features and the transformed speaker embedding vector may be combined together, and further provided to the neural vocoder 800. The neural vocoder 800 may be based on a neural generative model, and may generate a speech waveform 806 based on the combination of the transformed acoustic features and the transformed speaker embedding vector.

In an implementation, the neural vocoder 800 may comprise a plurality of dilated convolutional layers 830 which are grouped into a certain number of cycles. The plurality of dilated convolutional layers 830 may take the combination of the transformed acoustic features and the transformed speaker embedding vector as a condition. Skip connection 832 may be performed on outputs by the plurality of dilated convolutional layers 830. The neural vocoder 800 may further sequentially comprise Rectified Linear Unit (ReLU) 834, 1×1 convolutional layer 836, ReLU 838, 1×1 convolutional layer 840, a plurality of feed-forward layers 842 and a MoL unit 844. Through the above structure, the neural vocoder 800 may generate speech samples in a sequential way and finally output the speech waveform 806.

It should be appreciated that the structure of the neural vocoder 800 in FIG. 8 is exemplary, and depending on specific application designs and requirements, the neural vocoder 800 may be implemented in any other approaches.

Figure 9:
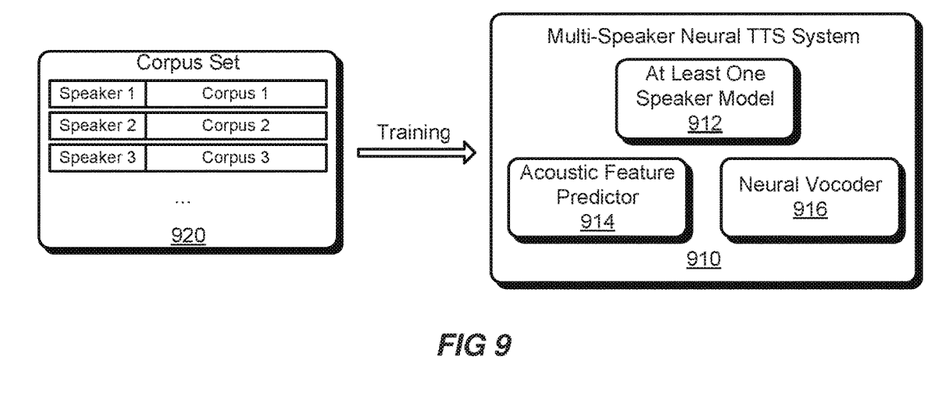
FIG. 9 illustrates an exemplary process for training a multi-speaker neural TTS system according to an embodiment.

FIG. 9 illustrates an exemplary process for training a multi-speaker neural TTS system according to an embodiment.

In order to train a multi-speaker neural TTS system 910, a multi-speaker corpus set 920 for training may be prepared. The corpus set 920 may comprise a plurality of corpuses of a plurality of speakers, e.g., corpus 1 of speaker 1, corpus 2 of speaker 2, etc. The corpus set is prepared in consideration of content coverage, speaker variety, style variety, etc.

In an aspect, the corpus set 920 has wide content coverage in various knowledge domains. Herein, "content" may refer to information expressed by speech waveforms in a corpus, and content coverage may be assessed with different linguistic contexts, e.g., phoneme, triphone, syllable, etc. In order to have a wide content coverage, speech waveforms in the corpus set 920 may come from various speech sources, e.g., news reporting, lectures, movie dubbings, daily conversations, etc. Accordingly, the collection of corpuses of different speakers in the corpus set 920 may provide rich content or linguistic coverage.

In an aspect, speakers in the corpus set 920 may have a balanced distribution in terms of age, gender, accents, etc. For example, the speakers may cover different age ranges, e.g., middle-aged people, old people, young people, etc. The speakers may cover different genders, e.g., male and female. The speakers may have different accents, e.g., American accent, British accent, Australian accent, etc. The speaker variety in the corpus set 920 may help to capture characteristics of different kinds of speakers and generate expressive speeches.

In an aspect, various styles of speech may be included in the corpus set 920. Herein, "style of speech" may refer to expression manner of a speaker, e.g., telling a story, giving a lecture, daily chatting, etc. The styles of speech may be also associated with requirements of products or users.

Moreover, the corpus set 920 may also be prepared in consideration of any other aspects for improving its variety and richness.

The training corpus set 920 prepared as discussed above may facilitate to enable the multi-speaker neural TTS system 910 to leverage content from different speakers, generate close-to-human speech for out-of-domain text inputs, enrich premium voices, create new speeches for a target speaker having only a small corpus, etc.

It is shown in FIG. 9 that the multi-speaker neural TTS system 910 may comprise at least one speaker model 912, an acoustic feature predictor 914 and a neural vocoder 916. The architecture of the multi-speaker neural TTS system 910 may be the same as the multi-speaker neural TTS system 200 in FIG. 2, and may be specifically implemented in either the structure in FIG. 5 or the structure in FIG. 6. In other words, if the at least one speaker model 912 is a single speaker model, it may connect to both the acoustic feature predictor 914 and the neural vocoder 916. While if the at least one speaker model 912 comprises two separate speaker models, one speaker model may connect to the acoustic feature predictor 914, and another speaker model may connect to the neural vocoder 916.

Training data for any one or any combination of the at least one speaker model 912, the acoustic feature predictor 914 and the neural vocoder 916 may be obtained based on the speech waveforms in the corpus set 920. For example, various derived information may be obtained from the speech waveforms, text information obtained through applying any existing speech recognition techniques, acoustic features obtained through applying any existing acoustic feature extracting techniques, speaker embedding vectors obtained through applying any existing speaker recognition techniques, etc. The derived information together with the speech waveforms in the corpus set 920 may form various training data for any one or any, combination of the at least one speaker model 912, the acoustic feature predictor 914 and the neural vocoder 916. For example, training data consisted of pairs of text input and acoustic features may be used for training the acoustic feature predictor 914, training data consisted of pairs of acoustic features and speech waveform may be used for training the neural vocoder 916, training data consisted of collections of text input, acoustic features and speech waveform may be used for training the at least one speaker model 912, the acoustic feature predictor 914 and the neural vocoder 916 jointly, and so on.

In the case that the at least one speaker model 912 is a single speaker model, the speaker model, the acoustic feature predictor 914 and the neural vocoder 916 may be trained separately based on the corpus set 920. Alternatively, the speaker model, the acoustic feature predictor 914 and the neural vocoder 916 may also be trained jointly based on the corpus set 920.

In the case that the at least one speaker model 912 comprises two speaker models, the acoustic feature predictor 914 and its corresponding speaker model may be trained jointly based on the corpus set 920, and the neural vocoder 916 and its corresponding speaker model may be trained jointly based on the corpus set 920. Alternatively, all of the two speaker models, the acoustic feature predictor 914 and the neural vocoder 916 may also be trained jointly based on the corpus set 920.

Figure 10:
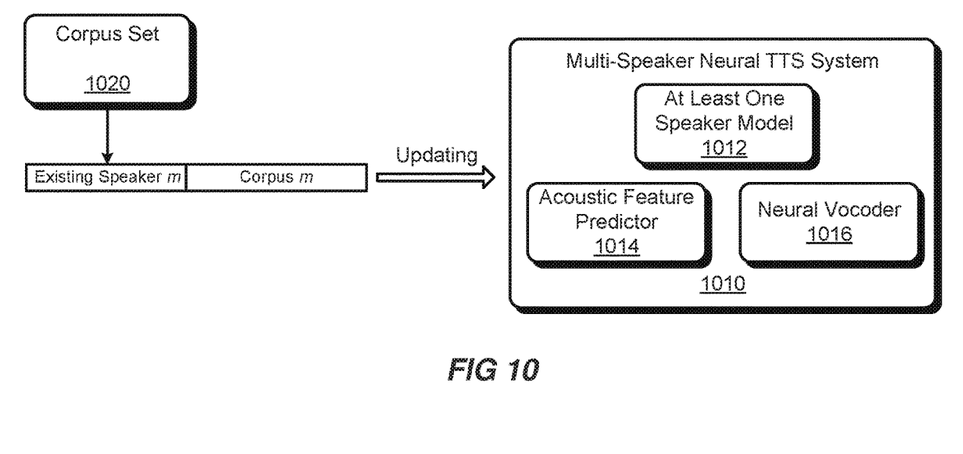
FIG. 10 illustrates an exemplary process for updating a multi-speaker neural TTS system according to an embodiment.

FIG. 10 illustrates an exemplary process for updating a multi-speaker neural TTS system according to an embodiment. In some implementations, after a multi-speaker neural TTS system has been trained, the multi-speaker neural TTS system may be further updated, e.g., retrained, by a subset of training data pairs in a multi-speaker corpus set which has been used for training the multi-speaker neural TTS system. The subset for updating may be one or more corpuses of one or more speakers in the corpus set. Through this way, the multi-speaker neural TTS system may be further refined by the corpus set.

In FIG. 10, a multi-speaker neural TTS system 1010 may be updated by a corpus set 1020 which has been used for training the multi-speaker neural TTS system 1010. The multi-speaker neural TTS system 1010 may correspond to the multi-speaker neural TTS system 910 in FIG. 9, and the corpus set 1020 may correspond to the corpus set 920 in FIG. 9.

A corpus m of a speaker in existing in the corpus set 1020 may be extracted from the corpus set 1020. Speech waveforms in the corpus in may be used for forming training data that is for further updating the multi-speaker neural TTS system 1010. The training data may be formed from the corpus in in a similar approach as discussed above in connection with FIG. 9, and at least one speaker model 1012, an acoustic feature predictor 1014 and a neural vocoder 1016 in the multi-speaker neural TTS system 1010 may be updated in a similar way with the training procedure of the multi-speaker neural TTS system 910 as discussed above in connection with FIG. 9. For example, any one or any combination of the at least one speaker model 1012, the acoustic feature predictor 1014 and the neural vocoder 1016 may be retrained based on the training data.

Through the updating process in FIG. 10, the generalization ability of the multi-speaker neural TTS system 1010 may be further improved. It should be noted that the speaker m may also be deemed as a target speaker. Moreover, although it is shown in FIG. 10 that only one corpus m is extracted from the corpus set, a different number of corpuses in the corpus set may be used for updating or retraining the multi-speaker neural TI'S system.

Figure 11:
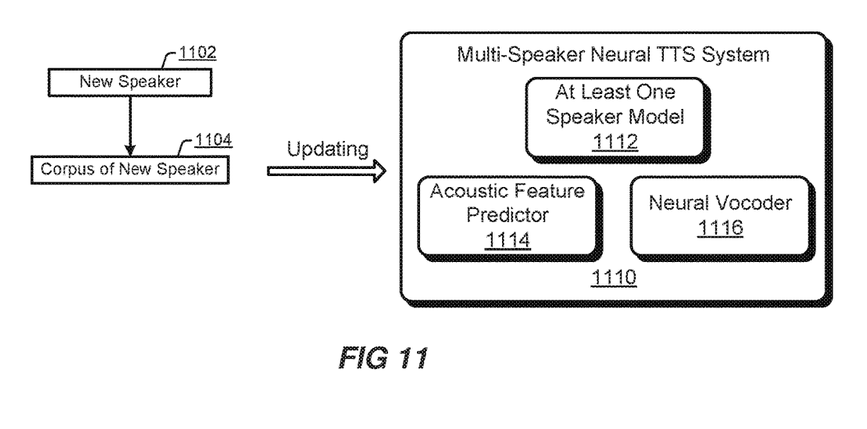
FIG. 11 illustrates an exemplary process for updating a multi-speaker neural TTS system according to an embodiment.

FIG. 11 illustrates an exemplary process for updating a multi-speaker neural TTS system according to an embodiment. In some implementations, when deploying or applying a multi-speaker neural TTS system, e.g., when it is to generate speech waveforms for a target speaker through the multi-speaker neural TTS system, the multi-speaker neural TTS system may be updated by a corpus of the target speaker, so as to adapt the multi-speaker neural TTS system to the target speaker.

In FIG. 11, a multi-speaker neural ITS system 1110 may be used for generating speech for a target speaker, e.g., a new speaker 1102 which is not existed in a corpus set used for training the multi-speaker neural TTS system 1110. The multi-speaker neural TTS system 1110 may correspond to the multi-speaker neural ITS system 910 in FIG. 9 or the multi-speaker neural TI'S system 1010 in FIG. 10.

A corpus 1104 of the new speaker 1102 may be obtained and used for forming training data that is for further updating the multi-speaker neural TI'S system 1110. The training data may be formed from the corpus 1104 of the new speaker 1102 in a similar approach as discussed above in connection with FIG. 9, and at least one speaker model 1112, an acoustic feature predictor 1114 and a neural vocoder 1116 in the multi-speaker neural ITS system 1110 may be updated in a similar way, with the training procedure of the multi-speaker neural TTS system 910 as discussed above in connection with FIG. 9. For example, any one or any combination of the at least one speaker model 1112, the acoustic feature predictor 1114 and the neural vocoder 1116 may be updated or retrained based on the training data.

Through the updating process in FIG. 11, the multi-speaker neural TTS system 1010 may be better adapted to the new speaker, and accordingly generate high quality speech waveforms with high speaker similarity, e.g., better stimulating voices of the new speaker to speak.

Figure 12:
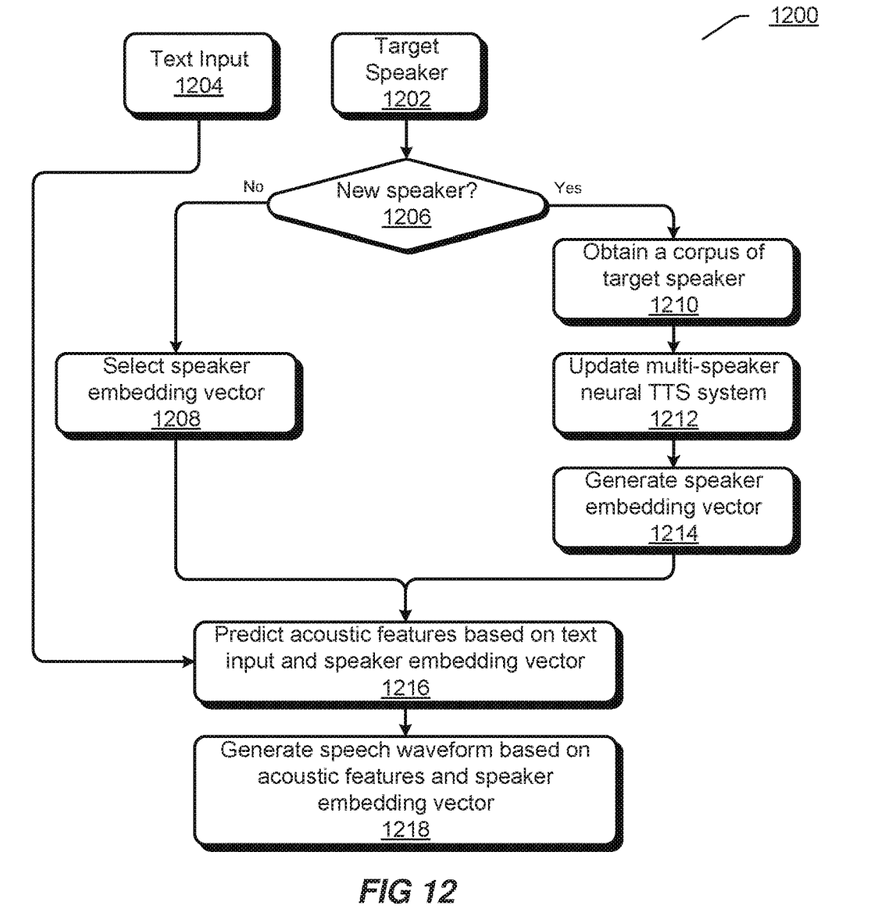
FIG. 12 illustrates an exemplary processing flow for generating a speech waveform according to an embodiment.

FIG. 12 illustrates an exemplary processing flow 1200 for generating a speech waveform according to an embodiment. The processing flow 1200 may be performed by a multi-speaker neural TTS system for generating a speech waveform corresponding to a text input in a target speaker's voice.

A text input 1204 may be received. At 1206, the processing flow 1200 may further determine whether a target speaker 1202 is a new speaker.

If it is determined that the target speaker 1202 is not a new speaker, e.g., the target speaker 1202 is an existing speaker in a corpus set used for training the multi-speaker neural TTS system, a speaker embedding vector corresponding to the target speaker may be selected at 1208 from a speaker embedding vector database through, e.g., a speaker embedding selector in a speaker model in the multi-speaker neural TTS system.

If it is determined that the target speaker 1202 is a new speaker, e.g., the target speaker 1202 is not existed in the corpus set, a corpus of the target speaker 1202 may be obtained at 1210.

At 1212, the corpus of the target speaker 1202 may be used for updating the multi-speaker neural TTS system according to, e.g., the updating process in FIG. 11.

At 1214, a speaker embedding vector of the target speaker 1202 may be generated through, e.g., a speaker encoder in the speaker model in the multi-speaker neural TTS system.

At 1216, acoustic features may be predicted through, an acoustic feature predictor in the multi-speaker neural TTS system based on the text input 1204 and the speaker embedding vector provided by the step 1208 or 1214.

At 1218, a speech waveform corresponding to the text input 1204 may be generated through, a neural vocoder in the multi-speaker neural ITS system based on the acoustic features and the speaker embedding vector.

It should be appreciated that depending on the specific structure of the multi-speaker neural TTS system, the predicting step at 1216 and the generating step at 1218 may utilize the same speaker embedding vector or different speaker embedding vectors. For example, if a single speaker model connects to both the acoustic feature predictor and the neural vocoder, the speaker embedding vector utilized by the predicting step at 1216 and the generating step at 1218 may be the same. While if two different speaker models connect to the acoustic feature predictor and the neural vocoder respectively, the speaker embedding vector utilized by the predicting step at 1216 may be different from that utilized by the generating step at 1218.

Moreover, it should be appreciated that, depending on specific designs and requirements, any steps and step orders in the processing flow 1200 may be adjusted, omitted or replaced according to the embodiments of the present disclosure. Any additional steps may also be added into the processing flow 1200. For example, if it is determined at 1206 that the target speaker is not a new speaker, e.g., the target speaker 1202 is an existing speaker in the training corpus set, the multi-speaker neural ITS system may also be updated based on a corpus of the target speaker in the corpus set according to, e.g., the updating process in FIG. 10.

Figure 13:
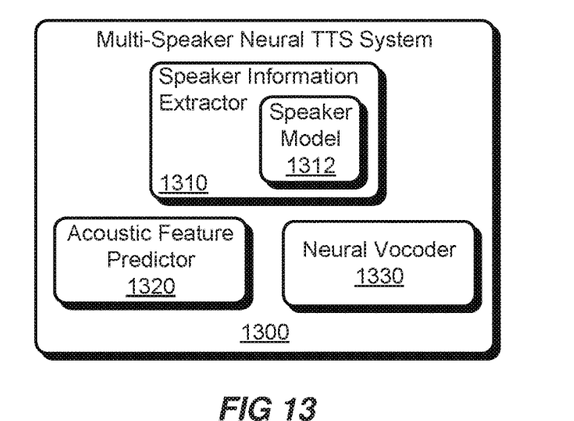
FIG. 13 illustrates an exemplary architecture of a multi-speaker neural TTS system according to an embodiment.

FIG. 13 illustrates an exemplary architecture of a multi-speaker neural TTS system 1300 according to an embodiment.

The multi-speaker neural TTS system 1300 may comprise a speaker information extractor 1310, an acoustic feature predictor 1320 and a neural vocoder 1330, wherein the speaker information extractor 1310 may comprise or implement at least one speaker model 1312. The speaker model 1312, the acoustic feature predictor 1320 and the neural vocoder 1330 may correspond to the speaker model 230, the acoustic feature predictor 210 and the neural vocoder 220 in FIG. 2 respectively.

In some implementations, the speaker information extractor 1310, the acoustic feature predictor 1320 and the neural vocoder 1330 may be implemented in a hardware level, e.g., implemented by respective hardware units. Herein, a hardware unit may refer to one or more processors, one or more chips, one or more central processing units (CPU), one or more graphic processing unit (GPU), etc., or any combination thereof. In some implementations, the speaker information extractor 1310, the acoustic feature predictor 1320 and the neural vocoder 1330 may also be implemented in a software level, e.g., implemented by computer programs, processor instructions, etc. The multi-speaker neural TTS system 1300 is not limited to any specific implementation approaches.

The speaker information extractor 1310 may be configured for providing speaker latent space information of a target speaker through the at least one speaker model 1312.

The acoustic feature predictor 1320 may be configured for predicting at least one acoustic feature based on a text input and the speaker latent space information.

The neural vocoder 1330 may be configured for generating a speech waveform corresponding to the text input based on the at least one acoustic feature and the speaker latent space information.

In an implementation, the at least one speaker model 1312 may comprise: a first speaker model, configured for providing first speaker latent space information in the speaker latent space information; and a second speaker model, configured for providing second speaker latent space information in the speaker latent space information. The acoustic feature predictor 1320 may be configured for predicting the at least one acoustic feature based on the text input and the first speaker latent space information. The neural vocoder 1330 may be configured for generating the speech waveform based on the at least one acoustic feature and the second speaker latent space information.

In an implementation, at least one of the at least one speaker model 1312, the acoustic feature predictor 1320 and the neural vocoder 1330 was pre-trained separately based on a plurality of corpuses of a plurality of speakers in a corpus set, and/or any two or more of the at least one speaker model 1312, the acoustic feature predictor 1320 and the neural vocoder 1330 were pre-trained jointly based on the plurality of corpuses of the plurality of speakers.

In an implementation; if the at least one speaker model 1312 comprises a first speaker model and a second speaker model, the first speaker model and the acoustic feature predictor were pre-trained jointly based on a plurality of corpuses of a plurality of speakers in a corpus set, and/or the second speaker model and the neural vocoder were pre-trained jointly based on the plurality of corpuses of the plurality of speakers.

In an implementation, at least one of the at least one speaker model 1312, the acoustic feature predictor 1320 and the neural vocoder 1330 may be updated separately based on a corpus of the target speaker, and/or any two or more of the at least one speaker model 1312, the acoustic feature predictor 1320 and the neural vocoder 1330 may be updated jointly based on the corpus of the target speaker.

In an implementation, in the case that the at least one speaker model 1312 comprises a first speaker model and a second speaker model, the first speaker model and the acoustic feature predictor may be updated jointly based on a corpus of the target speaker, and/or the second speaker model and the neural vocoder may be updated jointly based on the corpus of the target speaker.

Moreover, the speaker information extractor 1310, the acoustic feature predictor 1320 and the neural vocoder 1330 may also be configured for performing any other processes or operations according to the embodiments of the present disclosure as mentioned above.

Figure 14:
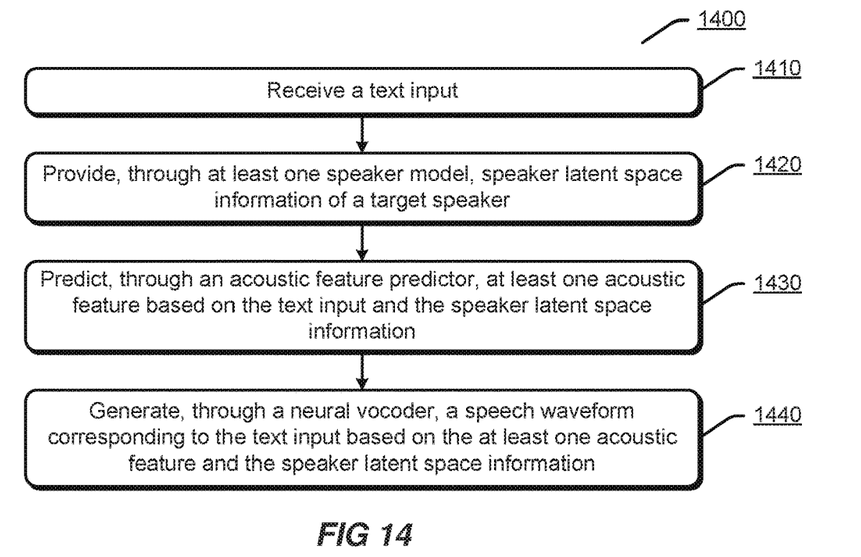
FIG. 14 illustrates a flowchart of an exemplary method for generating speech through multi-speaker neural TTS synthesis according to an embodiment.

FIG. 14 illustrates a flowchart of an exemplary method 1400 for generating speech through multi-speaker neural TTS synthesis according to an embodiment.

At 1410, a text input may be received.

At 1420, speaker latent space information of a target speaker may be provided through at least one speaker model.

At 1430, at least one acoustic feature may be predicted through an acoustic feature predictor based on the text input and the speaker latent space information.

At 1440, a speech waveform corresponding to the text input may be generated through a neural vocoder based on the at least one acoustic feature and the speaker latent space information.

In an implementation, the at least one speaker model may comprise a single speaker model.

In an implementation, the at least one speaker model may comprise a first speaker model and a second speaker model. The providing may comprise: providing first speaker latent space information through the first speaker model; and providing second speaker latent space information through the second speaker model. The predicting may comprise: predicting the at least one acoustic feature based on the text input and the first speaker latent space information. The generating may comprise: generating the speech waveform based on the at least one acoustic feature and the second speaker latent space information.

In an implementation, the providing may comprise: generating a speaker embedding vector of the target speaker based on a corpus of the target speaker; or selecting a speaker embedding vector of the target speaker from a speaker embedding vector database.

In an implementation, the method 1400 may further comprise: generating at least one transformed acoustic feature based on the at least one acoustic feature through a first neural network; and generating transformed speaker latent space information based on the speaker latent space information through a second neural network. The generating the speech waveform may comprise: generating the speech waveform based on a combination of the at least one transformed acoustic feature and the transformed speaker latent space information.

In an implementation, the method 1400 may further comprise: updating at least one of the at least one speaker model, the acoustic feature predictor and the neural vocoder separately based on a corpus of the target speaker; and/or updating any two or more of the at least one speaker model, the acoustic feature predictor and the neural vocoder jointly based on the corpus of the target speaker.

In an implementation, if the at least one speaker model comprises a first speaker model and a second speaker model, the method 1400 may further comprise: updating the first speaker model and the acoustic feature predictor jointly based on a corpus of the target speaker; and/or updating the second speaker model and the neural vocoder jointly based on the corpus of the target speaker.

In an implementation, at least one of the at least one speaker model, the acoustic feature predictor and the neural vocoder was pre-trained separately based on a plurality of corpuses of a plurality of speakers, and/or any two or more of the at least one speaker model, the acoustic feature predictor and the neural vocoder were pre-trained jointly based on the plurality of corpuses of the plurality of speakers.

In an implementation, in the case that the at least one speaker model comprises a first speaker model and a second speaker model, the first speaker model and the acoustic feature predictor were pre-trained jointly based on a plurality of corpuses of a plurality of speakers, and/or the second speaker model and the neural vocoder were pre-trained jointly based on the plurality of corpuses of the plurality of speakers.

In an implementation, the plurality of corpuses are prepared based on at least one of content coverage, speaker variety and style variety.

It should be appreciated that the method 1400 may further comprise any steps/processes for generating speech through multi-speaker neural TTS synthesis according to the embodiments of the present disclosure as mentioned above.

Figure 15:
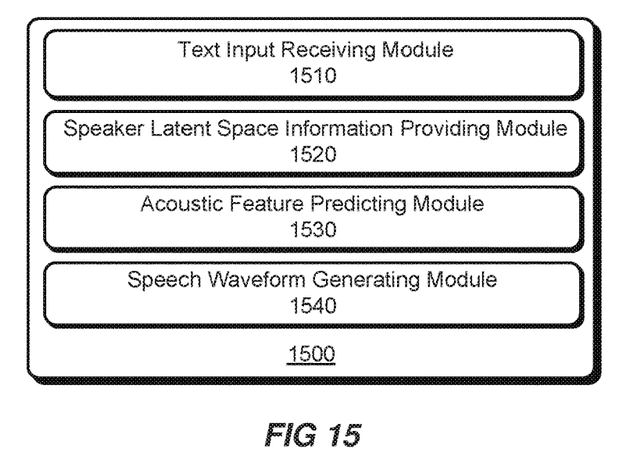
FIG. 15 illustrates an exemplary apparatus for generating speech through multi-speaker neural TTS synthesis according to an embodiment.

FIG. 15 illustrates an exemplary apparatus 1500 for generating speech through multi-speaker neural TTS synthesis according to an embodiment.

The apparatus 1500 may comprise: a text input receiving module 1510, for receiving a text input; a speaker latent space information providing module 1520, for providing, through at least one speaker model, speaker latent space information of a target speaker; an acoustic feature predicting module 1530, for predicting, through an acoustic feature predictor, at least one acoustic feature based on the text input and the speaker latent space information; and a speech waveform generating module 1540, for generating, through a neural vocoder, a speech waveform corresponding to the text input based on the at least one acoustic feature and the speaker latent space information.

Moreover, the apparatus 1500 may also comprise any other modules configured for generating speech through multi-speaker neural TTS synthesis according to the embodiments of the present disclosure as mentioned above.

Figure 16:
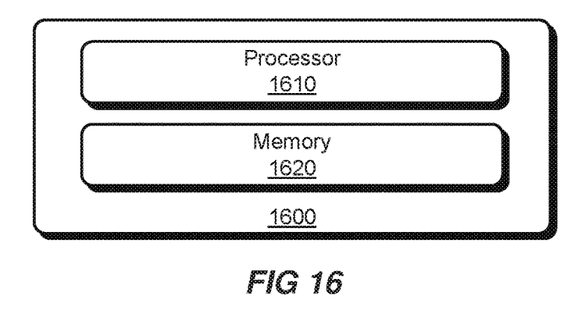
FIG. 16 illustrates an exemplary apparatus for generating speech through multi-speaker neural TTS synthesis according to an embodiment.

FIG. 16 illustrates an exemplary apparatus 1600 for generating speech through multi-speaker neural TTS synthesis according to an embodiment.

The apparatus 1600 may comprise at least one processor 1610 and a memory 1620 storing computer-executable instructions. When executing the computer-executable instructions, the at least one processor 1610 may: receive a text input; provide, through at least one speaker model, speaker latent space information of a target speaker; predict, through an acoustic feature predictor, at least one acoustic feature based on the text input and the speaker latent space information; and generate, through a neural vocoder, a speech waveform corresponding to the text input based on the at least one acoustic feature and the speaker latent space information.

The at least one processor 1610 may be further configured for performing any operations of the methods for generating speech through multi-speaker neural ITS synthesis according to the embodiments of the present disclosure as mentioned above.

The embodiments of the present disclosure may be embodied in a non-transitory computer-readable medium. The non-transitory computer-readable medium may comprise instructions that, when executed, cause one or more processors to perform any operations of the methods for generating speech through multi-speaker neural TTS synthesis according to the embodiments of the present disclosure as mentioned above.

It should be appreciated that all the operations in the methods described above are merely exemplary, and the present disclosure is not limited to any operations in the methods or sequence orders of these operations, and should cover all other equivalents under the same or similar concepts.

It should also be appreciated that all the modules in the apparatuses described above may be implemented in various approaches. These modules may be implemented as hardware, software, or a combination thereof. Moreover, any of these modules may be further functionally divided into sub-modules or combined together.

Processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in the present disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout the present disclosure. The functionality of a processor, any portion of a processor, or any combination of processors presented in the present disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, threads of execution, procedures, functions, etc. The software may reside on a computer-readable medium. A computer-readable medium may include, by way of example, memory such as a magnetic storage device (e.g., hard disk, floppy disk, magnetic strip), an optical disk, a smart card, a flash memory device, random access memory (RAM), read only memory (ROM), programmable ROM (PROM), erasable PROM (EPROM), electrically erasable PROM (EEPROM), a register, or a removable disk. Although memory is shown separate from the processors in the various aspects presented throughout the present disclosure, the memory may be internal to the processors, e.g., cache or register.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein. All structural and functional equivalents to the elements of the various aspects described throughout the present disclosure that are known or later come to be known to those of ordinary skilled in the art are expressly incorporated herein by reference and are intended to be encompassed by the claims.

What is claimed is:

1. A method for generating speech through multi-speaker neural text-to-speech (TTS) synthesis, comprising:
   receiving a text input at an acoustic feature predictor, the acoustic feature predictor including an encoder and a decoder, the decoder having:
      a linear projection;
      a feed forward layer, the feed forward layer receiving a first output from the linear projection;
      a memory layer; and
      convolution layers;
   providing, through at least one speaker model, speaker latent space information of a target speaker where the speaker latent space information has a first speaker embedding vector;
   using the feed forward layer, the memory layer, the convolution layers and a combination of a second output of the linear projection with an output of the convolution layers to predict at least one acoustic feature based on the text input and the speaker latent space information;
   receiving, at a first neural network, the at least one acoustic feature at a quasi-recurrent neural network of the first neural network;
   transforming, at the first neural network, the at least one acoustic feature from a first dimension to a second dimension;
   providing, to a second neural network, a second speaker embedding vector, the first speaker embedding vector and the second speaker embedding vector being associated with a same speaker, where the speaker latent space information has the second speaker embedding vector;

transforming, at the second neural network, the second speaker embedding vector from a third dimension to the second dimension;

combining the transformed second speaker embedding vector output from the second neural network and the transformed at least one acoustic feature output from the first neural network to generate a combined input; and generating, through a neural vocoder, a speech waveform corresponding to the text input based on the combined input and the speaker latent space information having the first speaker embedding vector and the second speaker embedding vector.

2. The method of claim 1, wherein the at least one speaker model comprises a single speaker model.

3. The method of claim 1, wherein the at least one speaker model comprises a first speaker model and a second speaker model, and providing the speaker latent space information of the target speaker comprises:

providing first speaker latent space information through the first speaker model; and providing second speaker latent space information through the second speaker model.

4. The method of claim 3, wherein:

predicting the at least one acoustic feature comprises:
predicting the at least one acoustic feature based on the text input and the first speaker latent space information, and generating the speech waveform comprises generating the speech waveform based on the at least one acoustic feature and the second speaker latent space information.

5. The method of claim 1, further comprising updating at least one of the at least one speaker model, the acoustic feature predictor and the neural vocoder separately based on a corpus of the target speaker.

6. The method of claim 3, further comprising:

updating the first speaker model and the acoustic feature predictor jointly based on a corpus of the target speaker; and/or updating the second speaker model and the neural vocoder jointly based on the corpus of the target speaker.

7. The method of claim 1, wherein at least one of the at least one speaker model, the acoustic feature predictor and the neural vocoder was pre-trained separately based on a plurality of corpuses of a plurality of speakers, and/or any two or more of the at least one speaker model, the acoustic feature predictor and the neural vocoder were pre-trained jointly based on the plurality of corpuses of the plurality of speakers.

8. The method of claim 3, wherein the first speaker model and the acoustic feature predictor were pre-trained jointly based on a plurality of corpuses of a plurality of speakers.

9. The method of claim 8, wherein the plurality of corpuses are prepared based on at least one of content coverage, speaker variety and style variety.

10. A multi-speaker neural text-to-speech (TTS) system, comprising:

a speaker information extractor, configured for providing speaker latent space information of a target speaker through at least one speaker model where the speaker latent space information has a first speaker embedding vector;

an acoustic feature predictor including an encoder and a decoder, the decoder having:

a linear projection;

a feed forward layer, the feed forward layer receiving a first output from the linear projection;

a memory layer; and convolution layers, wherein the acoustic feature predictor is configured to predict at least one acoustic feature based on a text input received at the acoustic feature predictor and the speaker latent space information using the feed forward layer, the memory layer, the convolution layers and a combination of a second output of the linear projection with an output of the convolution layers;

a first neural network configured to:

receive the at least one acoustic feature at a quasi-recurrent neural network of the first neural network; and transform the at least one acoustic feature from a first dimension to a second dimension;

a second neural network configured to:

receive a second speaker embedding vector, the first speaker embedding vector and the second speaker embedding vector being associated with a same speaker, where the speaker latent space information has the second speaker embedding vector; and transform the at least one acoustic feature from a third dimension to the second dimension;

a module configured for combining the transformed second speaker embedding vector output from the second neural network and the transformed at least one acoustic feature output from the first neural network to generate a combined input; and a neural vocoder, configured for generating a speech waveform corresponding to the text input based on the combined input and the speaker latent space information having the first speaker embedding vector and the second speaker embedding vector at the neural network.

11. The multi-speaker neural TTS system of claim 10, wherein the at least one speaker model comprises:

a first speaker model, configured for providing first speaker latent space information in the speaker latent space information; and a second speaker model, configured for providing second speaker latent space information in the speaker latent space information.

12. The multi-speaker neural TTS system of claim 11, wherein the acoustic feature predictor is configured for predicting the at least one acoustic feature based on the text input and the first speaker latent space information, and the neural vocoder is configured for generating the speech waveform based on the at least one acoustic feature and the second speaker latent space information.

13. The multi-speaker neural TTS system of claim 10, wherein at least one of the at least one speaker model, the acoustic feature predictor and the neural vocoder was pre-trained separately based on a plurality of corpuses of a plurality of speakers.

14. The multi-speaker neural TTS system of claim 11, wherein
the first speaker model and the acoustic feature predictor were pre-trained jointly based on a plurality of corpuses of a plurality of speakers.

15. The multi-speaker neural TTS system of claim 10, wherein
at least one of the at least one speaker model, the acoustic feature predictor and the neural vocoder is updated separately based on a corpus of the target speaker, and/or
any two or more of the at least one speaker model, the acoustic feature predictor and the neural vocoder are updated jointly based on the corpus of the target speaker.

16. The multi-speaker neural TTS system of claim 11, wherein the first speaker model and the acoustic feature predictor are updated jointly based on a corpus of the target speaker.

17. An apparatus for generating speech through multi-speaker neural text-to-speech (TTS) synthesis, comprising:
at least one processor; and
a memory storing computer-executable instructions that, when executed, cause the at least one processor to:
receive a text input at an acoustic feature predictor, the acoustic feature predictor including an encoder and a decoder, the decoder having:
a linear projection;
a feed forward layer, the feed forward layer receiving a first output from the linear projection;
a memory layer; and
convolution layers,
provide, through at least one speaker model, speaker latent space information of a target speaker where the speaker latent space information has a first speaker embedding vector;
use the feed forward layer, the memory layer, the convolution layers and a combination of a second output of the linear projection with an output of the convolution layers to at least one acoustic feature based on the text input and the speaker latent space information;
receive, at a first neural network, the at least one acoustic feature at a quasi-recurrent neural network of the first neural network;
transform, at the first neural network, the at least one acoustic feature from a first dimension to a second dimension;
provide, to a second neural network, a second speaker embedding vector, the first speaker embedding vector and the second speaker embedding vector being associated with a same speaker, where the speaker latent space information has the second speaker embedding vector;
transform, at the second neural network, the second speaker embedding vector from a third dimension to the second dimension;
combine the transformed second speaker embedding vector output from the second neural network and the transformed at least one acoustic feature output from the first neural network to generate a combined input; and
generate, through a neural vocoder, a speech waveform corresponding to the text input based on the combined input and the speaker latent space information having the first speaker embedding vector and the second speaker embedding vector.

18. The method of claim 1, further comprising updating any two or more of the at least one speaker model, the acoustic feature predictor and the neural vocoder jointly based on a corpus of the target speaker.

19. The method of claim 3, wherein the second speaker model and the neural vocoder were pre-trained jointly based on a plurality of corpuses of a plurality of speakers.

* * * * *